(12) United States Patent
Sterling et al.

(10) Patent No.: US 11,983,023 B2
(45) Date of Patent: May 14, 2024

(54) METHODS, SYSTEM AND APPARATUSES FOR IN SITU REMOVAL OF WINDOW DISTORTION

(71) Applicant: The Boeing Company, Chicago, IL (US)

(72) Inventors: Tyler R. Sterling, Bellevue, WA (US); Garrett Murdock Myhre, Seattle, WA (US); John Robert Lesh, Woodinville, WA (US); Thanh Dac Tran, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 1476 days.

(21) Appl. No.: 16/252,998

(22) Filed: Jan. 21, 2019

(65) Prior Publication Data

US 2019/0188343 A1 Jun. 20, 2019

Related U.S. Application Data

(63) Continuation of application No. 15/225,013, filed on Aug. 1, 2016, now Pat. No. 10,226,891.

(51) Int. Cl.
*G05D 23/22* (2006.01)
*B29C 35/02* (2006.01)
(Continued)

(52) U.S. Cl.
CPC .......... *G05D 23/22* (2013.01); *B29C 35/0288* (2013.01); *B29C 51/421* (2013.01); *B29C 51/46* (2013.01); *B29C 71/02* (2013.01); *B29C 73/34* (2013.01); *B32B 17/10963* (2013.01); *B64C 1/1476* (2013.01); *B64C 1/1484* (2013.01);
(Continued)

(58) Field of Classification Search
CPC ...... G05D 23/23; G05D 23/22; G05D 1/0607; B29C 35/0288; B29C 51/421; B29C 51/46; B29C 71/02; B29C 73/34; B32B 17/10963; B32B 2309/025; B32B 2369/00; B64C 1/1476; B64C 1/1484; B64F 5/40; G01C 23/005; H05B 1/0236; H05B 3/84; B29K 2101/10; B29K 2105/256; B29K 2995/0026; B29L 2031/3052; B29L 2031/778; F41H 5/04
See application file for complete search history.

(56) References Cited

U.S. PATENT DOCUMENTS 10,588,178 B1 * 3/2020 Nelson .................. H05B 3/141
10,591,221 B1 * 3/2020 Tucker .................. C30B 29/48
(Continued)

FOREIGN PATENT DOCUMENTS

CA      2995947 C * 9/2020 ............. B29C 73/02
CN    201266134 Y    7/2009
(Continued)

OTHER PUBLICATIONS

Olson, R., "Acceptable Glass Window/Windshield Repair Processes and Approved Vendors", Material and Process Specification Report for Sep. 1991-Dec. 31, 1995, Feb. 1996, pp. 1-55, Battelle.

*Primary Examiner* — Shawntina T Fuqua
(74) *Attorney, Agent, or Firm* — COATS & BENNETT, PLLC (57) ABSTRACT

Methods systems and apparatuses for reducing or substantially eliminating distortion in a transparent substrate in situ are disclosed.

20 Claims, 8 Drawing Sheets

(51) Int. Cl.
  *B29C 51/42*   (2006.01)
  *B29C 51/46*   (2006.01)
  *B29C 71/02*   (2006.01)
  *B29C 73/34*   (2006.01)
  *B32B 17/10*   (2006.01)
  *B64C 1/14*    (2006.01)
  *B64F 5/40*    (2017.01)
  *G01C 23/00*   (2006.01)
  *G05D 23/27*   (2006.01)
  *H05B 1/02*    (2006.01)
  *H05B 3/84*    (2006.01)
  *B29K 101/10*  (2006.01)
  *B29K 105/00*  (2006.01)
  *B29L 31/00*   (2006.01)
  *B29L 31/30*   (2006.01)

(52) U.S. Cl.
  CPC .............. *B64F 5/40* (2017.01); *G01C 23/005* (2013.01); *G05D 23/27* (2013.01); *H05B 1/0236* (2013.01); *H05B 3/84* (2013.01); *B29K 2101/10* (2013.01); *B29K 2105/256* (2013.01); *B29K 2995/0026* (2013.01); *B29L 2031/3052* (2013.01); *B29L 2031/778* (2013.01); *B32B 2309/025* (2013.01); *B32B 2369/00* (2013.01)

(56) References Cited

U.S. PATENT DOCUMENTS

| | | | |
|---|---|---|---|
| 11,363,683 B2 * | 6/2022 | Han | ................ H05B 3/748 |
| 2009/0297788 A1 | 12/2009 | Dull et al. | |
| 2018/0029285 A1 * | 2/2018 | Sterling | ................ B29C 71/02 |

FOREIGN PATENT DOCUMENTS

| | | | | |
|---|---|---|---|---|
| CN | 105800920 A | | 7/2016 | |
| CN | 109792803 A | * | 5/2019 | ....... B32B 17/10036 |
| FR | 22120070 A1 | | 8/1972 | |
| FR | 2991229 A1 | | 12/2013 | |
| JP | 2002225682 A | | 8/2002 | |
| JP | 2016172461 A | * | 9/2016 | ........... B64C 1/1476 |
| WO | 2015079124 A1 | | 6/2015 | |

* cited by examiner

METHODS, SYSTEM AND APPARATUSES FOR IN SITU REMOVAL OF WINDOW DISTORTION

This Application is a Continuation Application of U.S. patent application Ser. No. 15/225,013 filed Aug. 1, 2016, issued Mar. 12, 2019 as U.S. Pat. No. 10,226,891, the entire contents of which are incorporated by reference herein.

STATEMENT OF GOVERNMENT RIGHTS

Aspects of this disclosure were made with Government support under N00019-C-12-0112 awarded by Department of Defense. The government has certain rights in this invention.

TECHNOLOGICAL FIELD

The present disclosure generally relates to the field of transparent substrate repair. More particularly, the present disclosure relates to repairing transparent substrates in situ, for example, without removing transparent substrates from an installed orientation in a position of end use.

BACKGROUND

Windows are substantially transparent structural components, and are incorporated into stationary structures and mobile structures alike. Vehicles may incorporate windows including, but not limited to, specialized windows (e.g. windshields, etc.) to provide transparent viewing out of vehicles. Many windows and windshields comprise a multi-layer, or laminate structure that imparts desirable characteristics to the transparent structures. Such desirable characteristics include improved strength, durability, resistance to damage or breakage, resistance to shattering, etc.

In use, transparent structures such as windows and windshields may sustain damage or an adverse degradation in their optimum optical transmissivity including, but not limited to rippling, distortion etc. Some of the adverse degradation may include force induced distortion, or rippling causing varying visible degrees of optical distortion. When it becomes necessary to repair windows and windshields that have incurred an unacceptable degree of damage due, for example, to force induced rippling, such repair requires taking the vehicle out of service for an amount of time, and removing and replacing the windows or windshields. This required maintenance for replacing windows and windshields is time consuming and costly. Improved window and windshield maintenance and repair processes that reduce time and expense would be advantageous.

BRIEF SUMMARY

An aspect of the present disclosure is directed to a method comprising contacting a first heat source to a first side of a transparent substrate, with the transparent substrate comprising an amount of distortion, and with the first heat source in communication with a controller; positioning a second heat source at a predetermined distance from a second side of the transparent substrate, with the second heat source in communication with the first or a second controller; activating the first and second heat sources; increasing the surface temperature of the first and second sides of the transparent substrate in situ to a predetermined temperature; maintaining the surface temperature of the first and second sides of the transparent substrate at predetermined temperatures for predetermined durations; and reducing distortion in the transparent substrate in situ.

Another aspect of the present disclosure is directed to, after or coincident with the step of contacting a first heat source to a first side of a transparent substrate, positioning at least one sensor on each of the first and second sides of the transparent substrate, with the heat sensors in communication with one or more controllers. It is therefore contemplated that a single controller may be in communication with both heat sources, or each heat source may be in communication with a separate controller.

A further aspect is directed to, after or coincident with increasing the surface temperature of the first and second sides of the transparent substrate in situ to a predetermined temperature, monitoring the surface temperature of the first and second sides of the transparent substrate.

In another aspect, in the step of contacting a first heat source to a first side of a transparent substrate, the transparent substrate comprises a windshield or a window.

In a further aspect, in the step of contacting a first heat source to a first side of a transparent substrate, the first side of the transparent substrate comprises an exterior surface, and the first heat source comprises a heat blanket.

In yet another aspect, in the step of positioning a second heat source at a predetermined distance from a second side of a transparent substrate, the second side of the transparent substrate comprises an interior surface, and the second heat source comprises at least one heat gun.

In another aspect, in the step of positioning a second heat source at a predetermined distance from a second side of a transparent substrate, the second heat source is in communication with a device for radiating heat.

In still another aspect, in the step of positioning a second heat source at a predetermined distance from a second side of a transparent substrate, the second heat source is positioned proximate to the second side of the transparent substrate.

In another aspect, in the step of positioning heat sensors on the first and second sides of the transparent substrate, said heat sensors comprise at least one thermocouple.

In a further aspect, in the step of maintaining the surface temperature of the first and second sides of the transparent substrate, the first side of the transparent substrate comprises an exterior surface and the temperature is maintained at a temperature ranging from about 160° F. to about 167° F. for a duration ranging from about 150 mins to about 210 mins.

In yet another aspect, in the step of maintaining the surface temperature of the first and second sides of the transparent substrate, the second side of the transparent substrate comprises an interior surface and the temperature is maintained at a temperature ranging from about 160° F. to about 165° F. for a duration ranging from about 150 mins to about 210 mins.

In yet another aspect, in the step of reducing distortion in the transparent substrate in situ, the distortion is reduced in an amount ranging from about 10% to 100%.

In a further aspect, in the step of contacting a first heat source to a first side of a transparent substrate having an amount of distortion, the transparent substrate comprises at least two layers of dissimilar material.

In yet another aspect, in the step of contacting a first heat source to a first side of a transparent substrate having an amount of distortion, the first side of the transparent substrate comprises at least one layer comprising a polymeric thermoset material.

In yet another aspect, in the step of contacting a first heat source to a first side of a transparent substrate having an amount of distortion, the transparent substrate comprises a layer comprising a polyurethane-containing material, a polyvinyl butyral resin-containing material, polyether-containing material and combinations thereof.

In a further aspect, in the step of contacting a first heat source to a first side of a transparent substrate having an amount of distortion, the transparent substrate comprises a layer configured to act as a spall shield.

In still another aspect, in the step of positioning a second heat source at a predetermined distance from a second side of the transparent substrate, the second side of the transparent substrate comprises at least one layer comprising glass.

Another aspect is directed to an object comprising a transparent substrate having distortion that is removed according to a method comprising contacting a first heat source to a first side of a transparent substrate, with the transparent substrate comprising an amount of distortion, with the transparent substrate positioned in place as a component in a larger structural assembly, and with the first heat source in communication with a controller; positioning a second heat source at a predetermined distance from a second side of the transparent substrate, with the second heat source in communication with the first or second controller; positioning at least one sensor each on the first and second sides of the transparent substrate, with the heat sensors in communication with the controller; activating the first and second heat sources; increasing the surface temperature of the first and second sides of the transparent substrate to heat the first and second sides of the transparent substrate in situ to a predetermined temperature; monitoring the surface temperature of the first and second sides of the transparent substrate; maintaining the surface temperature of the first and second sides of the transparent substrate at predetermined temperatures for predetermined durations; and reducing distortion in the transparent substrate in situ.

In a further aspect, the object is a stationary structure.

In another aspect, the object is a vehicle.

In yet another aspect, the vehicle is selected from group consisting of: a manned aircraft, an unmanned aircraft, a manned spacecraft, an unmanned spacecraft, a manned rotorcraft, an unmanned rotorcraft, a manned terrestrial vehicle, an unmanned terrestrial vehicle, a manned waterborne surface vehicle, an unmanned water borne surface vehicle, a manned waterborne sub-surface vehicle, an unmanned waterborne sub-surface vehicle, and combinations thereof.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

The presently disclosed subject matter now will be described more fully hereinafter with reference to the accompanying Drawings (i.e. FIGS.), in which some, but not all aspects of the presently disclosed subject matter are shown. Like numbers refer to like elements throughout. The presently disclosed subject matter may comprise many different forms and should not be construed as limited to the aspects set forth herein; rather, many aspects are provided so that this disclosure will satisfy applicable legal requirements. Indeed, many modifications and other alternatives of the presently disclosed subject matter set forth herein will come to mind to one skilled in the art, to which the presently disclosed subject matter pertains having the benefit of the teachings presented in the foregoing descriptions and the associated Drawings. Therefore, it is to be understood that the presently disclosed subject matter is not to be limited to the specific aspects disclosed and that modifications and other aspects are intended to be included within the scope of the appended claims.

Aspects of the present disclosure are directed to methods, systems and apparatuses for reducing or substantially eliminating distortion from a transparent substrate while the transparent substrate remain in position, in situ, integrated into a larger structure. Transparent substrates include, but are not limited to windows, windshields, etc. The term "substantially eliminating" refers to the elimination of more than about 90% of distortion from a transparent substrate. The term "transparent" refers to the percentage of light that passes through an object having a transmissivity value ranging from about 0% to about 100%.

According to aspects of the present disclosure, heat is applied in situ to interior and exterior sides of an installed transparent substrate in a predetermined and controlled heating regimen, and for a predetermined duration, to restore a transparent substrate to an original degree of optical clarity and transmissivity by reducing or substantially eliminating visible distortion from the transparent substrate. Visible distortion includes, without limitation, the conditions known as rippling, including rippling that may be force induced. By reducing or substantially eliminating distortion from the transparent substrate in situ, the transparent substrate is substantially returned to its original shape and/or dimension. Importantly, the restoration of the transparent substrate through the removal or substantial elimination of distortion is conducted in situ. That is, the treatment performed on the transparent substrate is conducted while the transparent substrate is in its installed position as a part of a larger structure, device or object, etc., including, without limitation, stationary objects such as buildings, etc., and mobile objects, such as vehicles, including, without limitation, manned and unmanned aircraft, spacecraft, terrestrial vehicles and surface and sub surface marine vehicles, etc.

Figure 1:
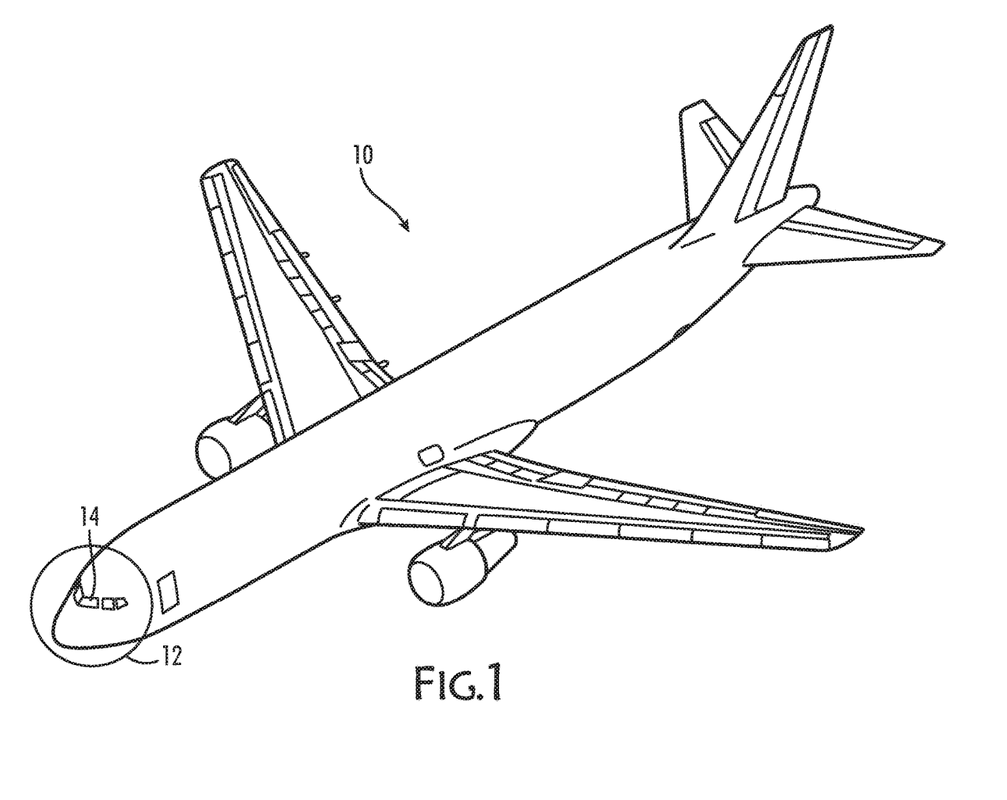
FIG. 1 is a perspective view of an aircraft having a front section comprising at least one transparent substrate.
Figure 2:
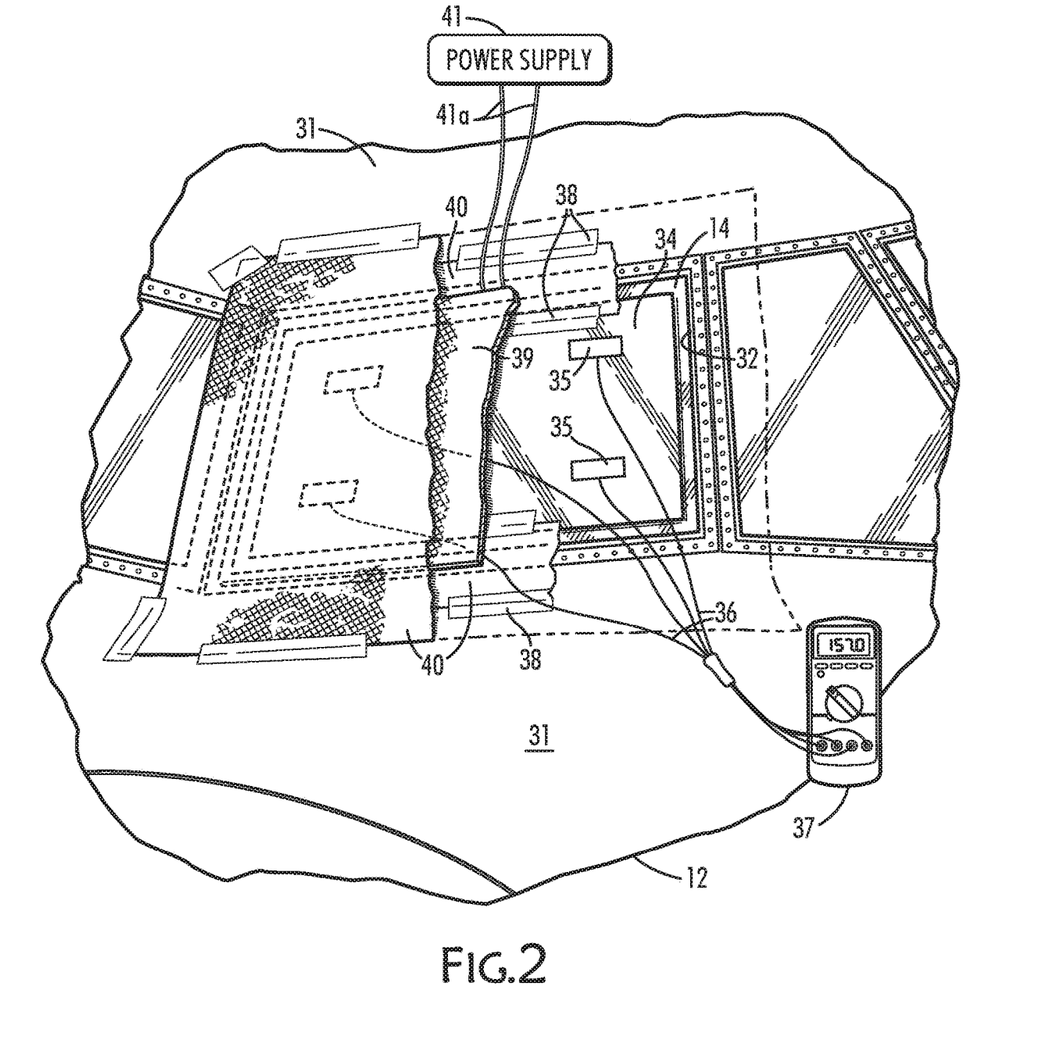
FIG. 2 is perspective view of the front section of an aircraft showing a heat source applied to the exterior of a windshield section.

FIG. 1 shows an aircraft 10 comprising a nose section 12 comprising at least one window 14. As shown in FIG. 2, a nose section exterior 12 of an aircraft is shown comprising the aircraft body 31. Window supports 32 are shown engaging the window 14 and features of the aircraft body 31. Aluminum heat distributer 34 is shown with thermocouples 35 attached to the aluminum heat distributer 34. Thermocouple wires 36 are shown extending from thermocouple end probes 35 to a first controller 37. Thermocouple end probes 35 are understood to comprise a thermocouple end for sensing heat, and a means for attaching the thermocouple end to a surface, such as, for example, a section of Teflon tape, etc. Sections of Teflon tape 38 are shown, and are used to secure the aluminum heat distributer 34 into place against the exterior surface of the window 33. A heat blanket 39 is oriented between the aluminum heat distributer 34 and a breather cloth 40. A power supply 41 is in communication with heat blanket 39 via heat blanket power cords 41a.

Figure 3:
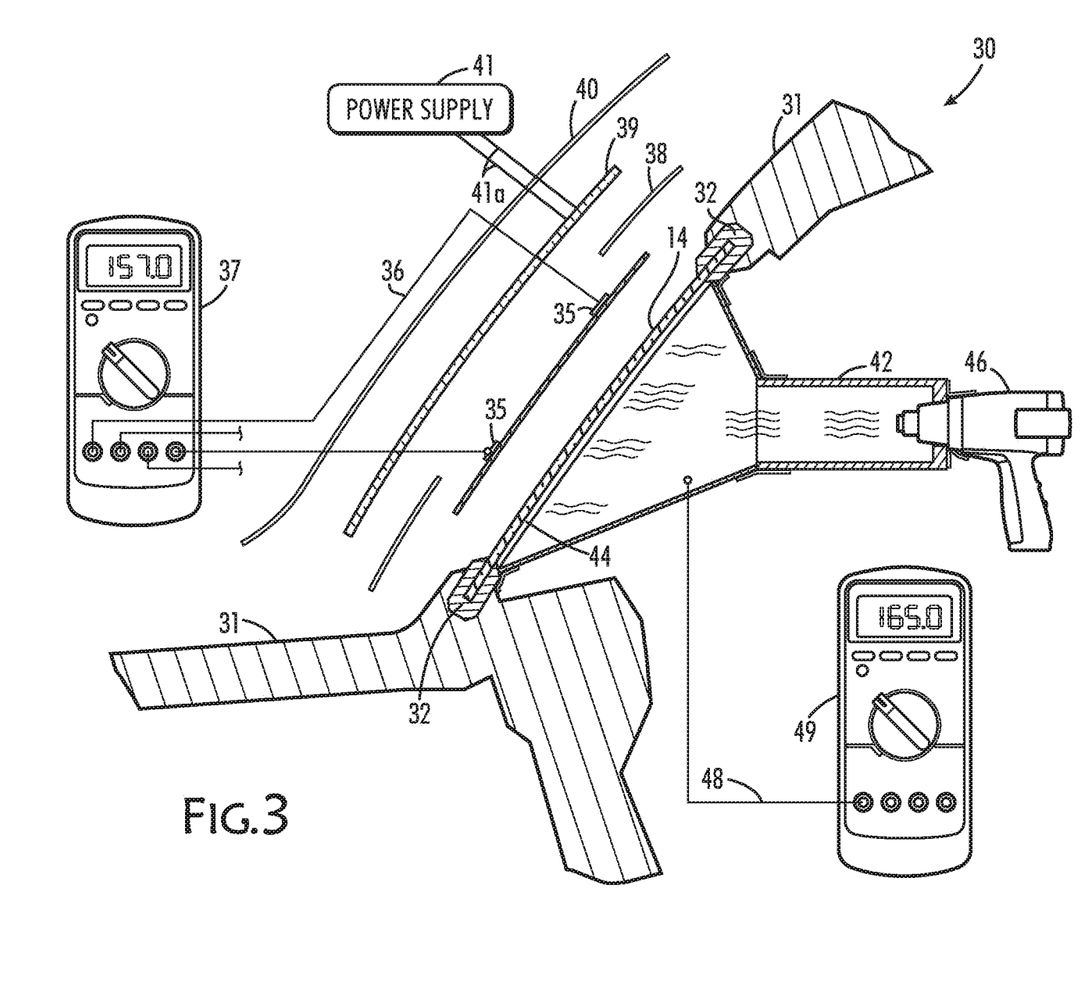
FIGS. 3, 4 and 4a are perspective views of an aspect of the present disclosure showing a heat source and its position proximate to the interior surface and exterior surface of an aircraft windshield.

FIG. 3 shows an exploded cross-sectional view of an aspect of the present disclosure. Within the aircraft cabin 30, a heat box 42 is positioned within the cabin 30, such that a small gap 44 exists between the heat box and the interior surface of the window 14. The gap 44 is less than about 0.2" and is maintained to prevent high temperatures of the heat box from directly impacting the interior surface of the window 14. Heat gun 46 is shown in place at one end of the heat box 42. A thermocouple end (not shown) is substantially centered and suspended in the heat box and positioned within about 1" of the interior surface of the window, without contacting the interior surface of the window 14. A power supply 41 is in communication with heat blanket 39 via heat blanket power cords 41a. Thermocouple wire 48 extends from the thermocouple end in the heat box (not shown) and is shown extending through the heater box and attaching to second controller 49.

Figure 4:
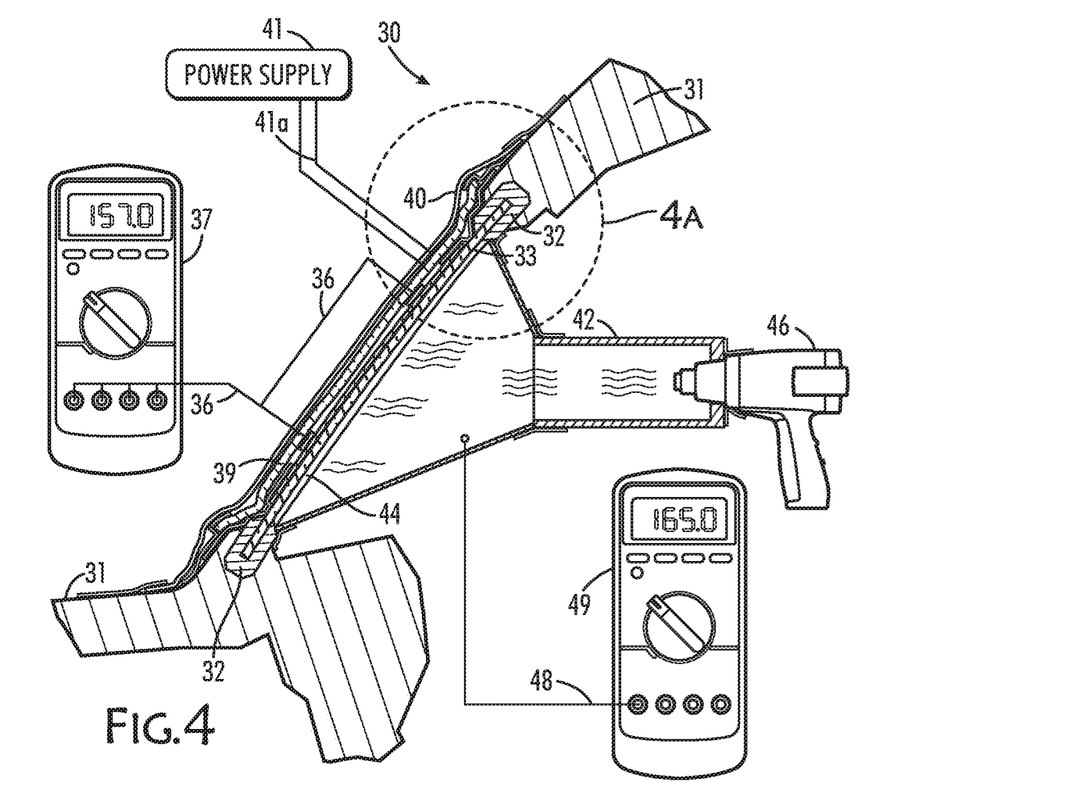
Figure 4A:
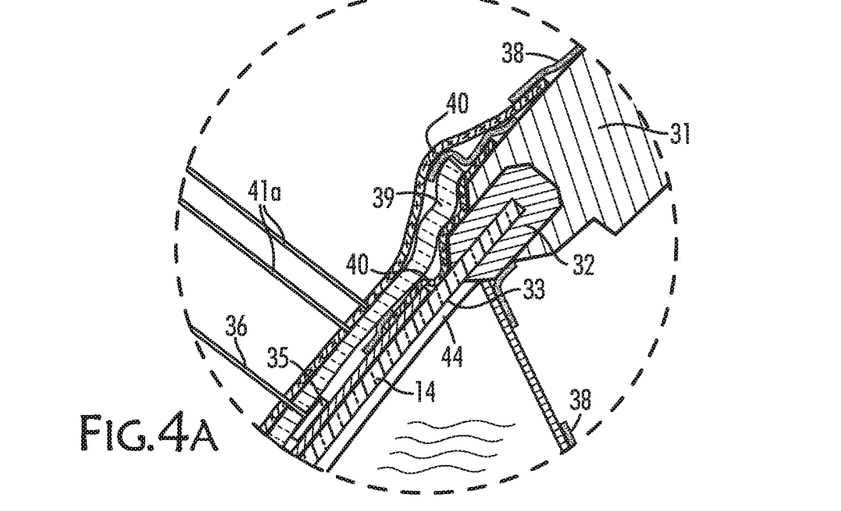

FIG. 4 shows an assembled version of the system shown in FIG. 3 now with the described components in place. FIG. 4a is an enlarged view of aspects shown in FIGS. 3 and 4.

Figure 5:
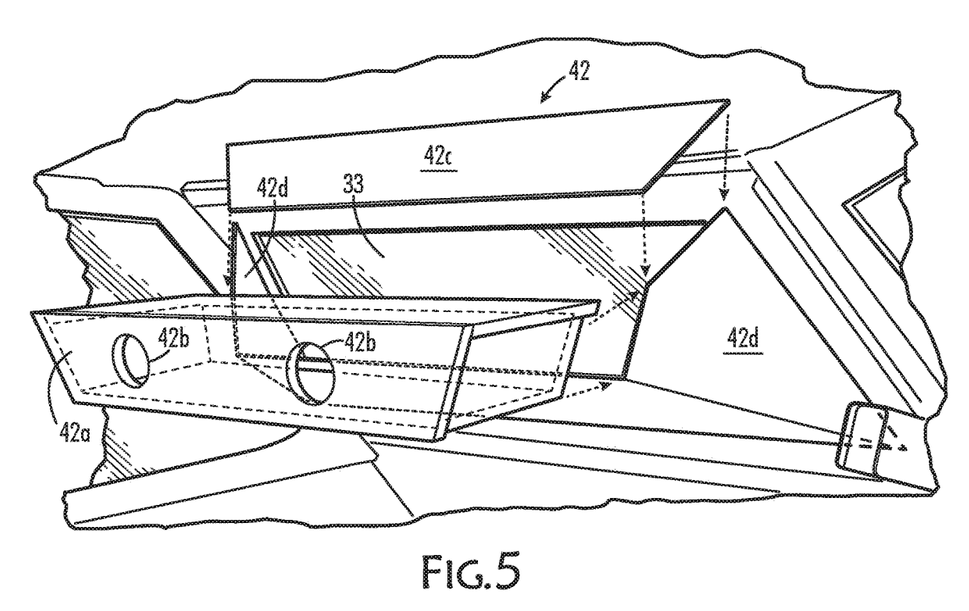
FIG. 5 is a perspective view of a heat box assembly according to an aspect of the present disclosure.

FIG. 5 is a perspective view of the heat box shown in FIGS. 3, 4 and 4a. As shown in FIG. 5, the heat box assembly 42 can comprise multiple sections that are assembled into a single unit. As shown in FIG. 5, heat box section 42a comprises heat box openings 42b that each can accommodate a heat gun (not shown in FIG. 5). Heat box frame sections 42c and 42d connect with section 42a and 42b to complete the heat box 42. It is understood that, if desired, the heat box may be manufactured as a unitary part, or may comprise additional components that together comprise the heat box assembly.

Figure 6:
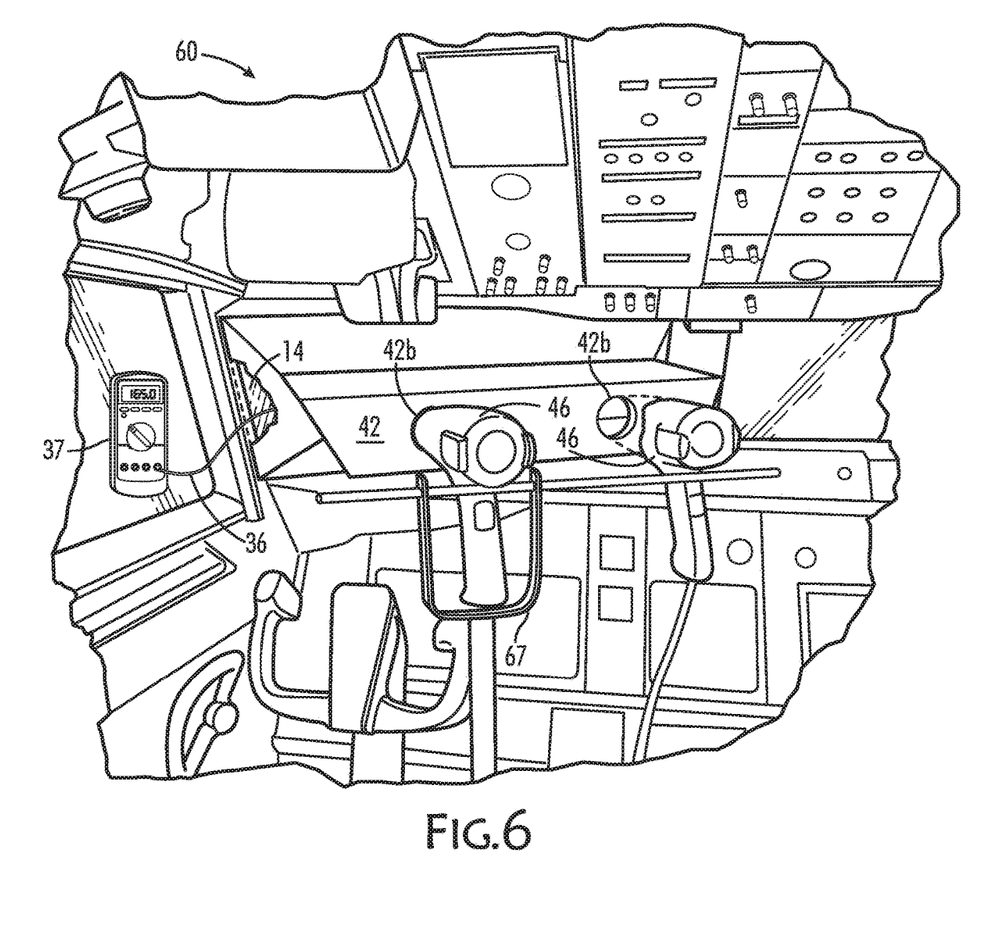
FIG. 6 is a perspective view of an aspect of the present disclosure.

FIG. 6 is a representative illustration showing the cockpit within the cabin area of the aircraft 10 of FIG. 1, with aspects of the present disclosure in position to heat the interior of a window to reduce or substantially eliminate window distortion. As shown in FIG. 6, cockpit interior 60 comprises a heat box assembly 42 in position with one end located proximate to the interior surface of a window 14 with heat guns 46 shown protruding into openings 42b in an end of heat box assembly 42. As shown in FIG. 6, one heat gun 46 is supported by a heat gun pedestal 67. It is understood that both heat guns 46 may be supported via a pedestal 67, or may be supported another way, such as, for example being supported by a feature of the heat box itself, or via some other support. Controller 37 is shown connected to one end of a thermocouple wire 36, with another end of thermocouple wire 36 engaged to a thermocouple (not shown) that is proximate to, though not in direct contact with the exterior surface of window 14.

Figure 7:
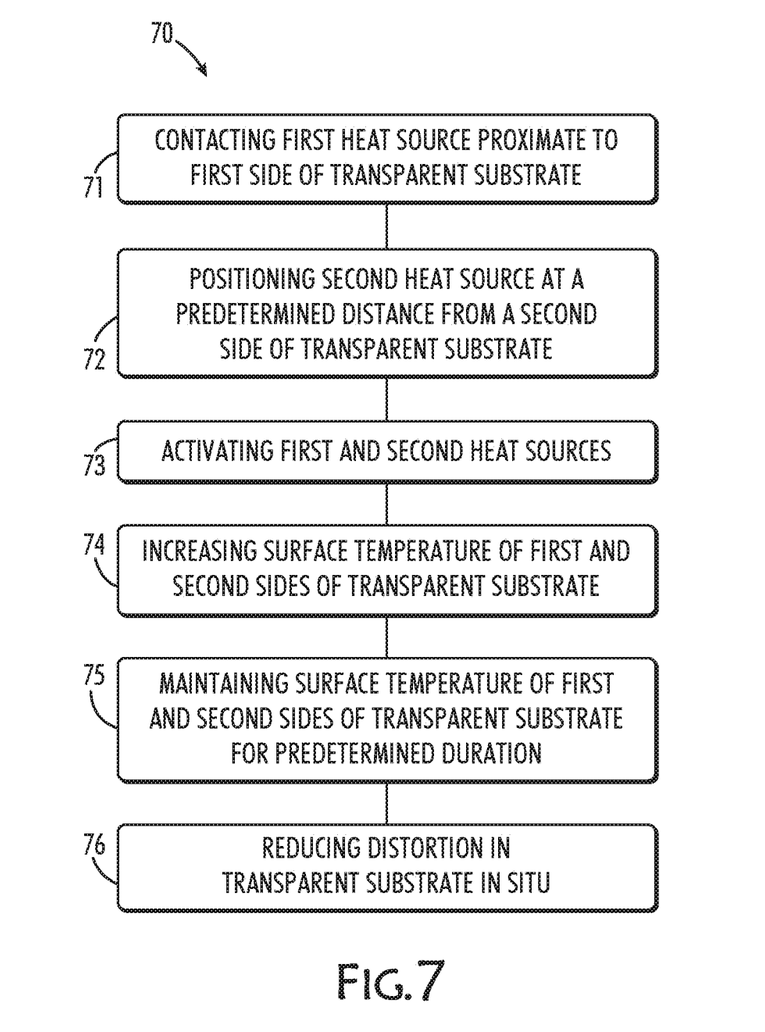
FIGS. 7-8 are flowcharts outlining methods according to aspects of the present disclosure.
Figure 8:
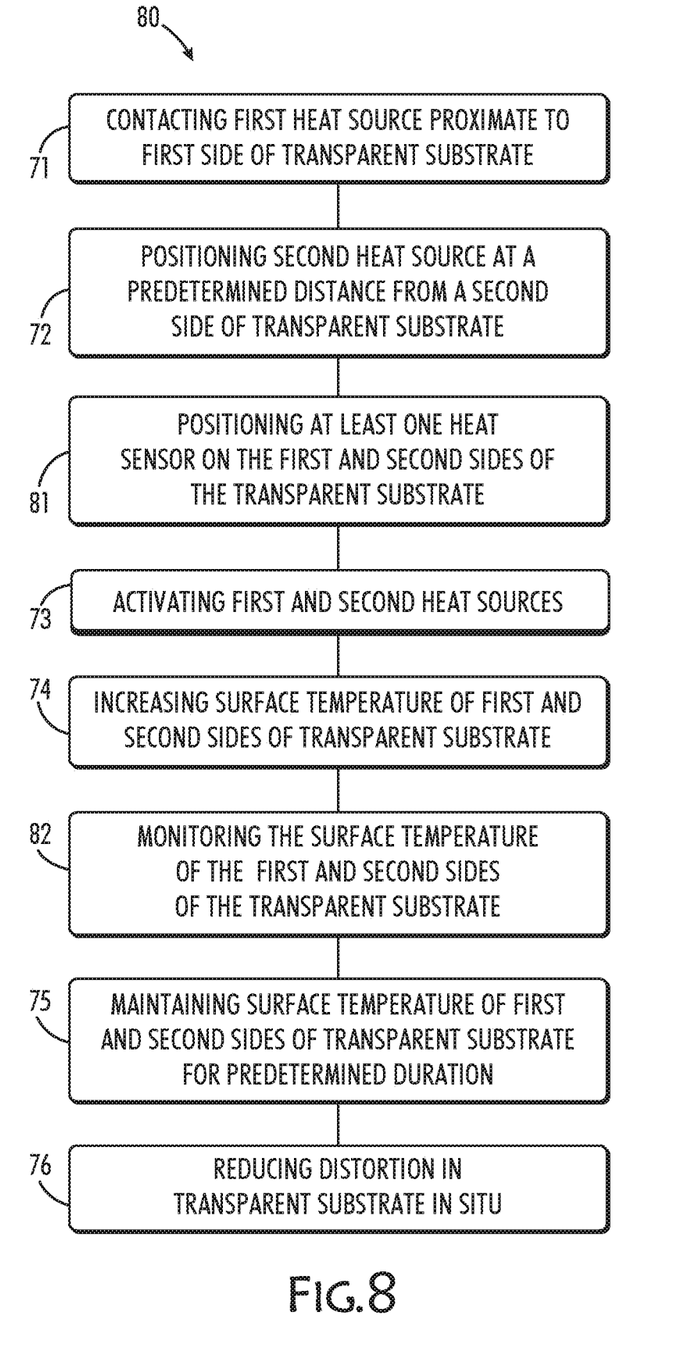

FIGS. 7-8 are flowcharts outlining methods according to aspects of the present disclosure. FIG. 7 outlines a method 70 comprising, 71 contacting a first heat source proximate to a first side of a transparent substrate, 72 positioning a second heat source at a predetermined distance from a second side of the transparent substrate, 73 activating the first and second heat sources, 74 increasing the surface temperature of the first and second sides of the transparent substrate, 75 maintaining surface temperatures of the first and second sides of the transparent substrate for a predetermined duration, and 76 reducing distortion in the transparent substrate in situ.

FIG. 8 outlines a method 80 for reducing distortion in a transparent substrate in situ comprising, 71 contacting a first heat source to a first side of a transparent substrate, 72 positioning a second heat source at a predetermined distance from a second side of the transparent substrate, 81 positioning at least one heat sensor on the first and second sides of the transparent substrate, 73 activating the first and second heat sources, 74 increasing the surface temperature of the first and second sides of the transparent substrate, 82 monitoring the surface temperature of the first and second sides of the transparent substrate, 75 maintaining surface temperatures of the first and second sides of the transparent substrate for a predetermined duration, and 76 reducing distortion in the transparent substrate in situ.

While aspects of the present application disclose the use of a heat blanket in combination with an aluminum heat distributer, it is understood that any heat source may be used that can be controlled to deliver a substantially controllable amount of heat that can be monitored to maintain a temperature of from about 160° F. to about 167° F. to the exterior surface of a transparent substrate. Such heat sources include, but are not limited to, at least one heat lamp, at least one heat gun, an infrared heater, etc., and combinations thereof. Similarly, while aspects of the present application disclose the use of heat guns oriented into a heat box assembly, it is understood that any heat source may be used that can be controlled to deliver a substantially controllable amount of heat that can be monitored to maintain a temperature of from about 160° F. to about 167° F. to the interior surface of a transparent substrate. Such heat sources include, but are not limited to at least one heat lamp, at least one heat gun, an infrared heater, etc., and combinations thereof.

Aspects of the present disclosure describe a second heat source for heating the second side, or second side interior surface of the transparent substrate that contemplates a heat box that is proximate to, but not in direct contact with, the second side. As such, a necessary gap exists between the second heat source assembly and the second side of the transparent substrate. However, it is understood that further heat sources are contemplated that could be in direct contact with, or proximate to but not in direct contact with, the second side of the transparent substrate, so long as the contact did not interfere with the distortion removal, or otherwise adversely affect the properties of the transparent substrate (e.g. providing a temperature to the second side that exceeded the glass transition temperature, or the melting point of materials incorporated into the transparent substrate, or materials that are positioned adjacent to the transparent substrate including, but not limited to, moldings, fasteners, fittings, etc.

In addition, while aspects of the present application disclose the use of thermocouples to sense and monitor a surface temperature, it is understood that any means for measuring and relaying information regarding a temperature, and/or controlling or regulating a temperature can be used, including, without limitation, a non-contact infrared thermometer, a non-reversible temperature label, a wireless temperature monitoring device, etc., and combinations thereof.

Further, it is understood that the thermocouples and heat sources disclosed herein can be coupled appropriately with, or otherwise be in communication with, necessary controllers and software, hardware, computers and computer programs, etc. to run such software, hardware and controllers, etc. In addition, the assemblies and systems for removing and/or substantially eliminating distortion from transparent substrates in situ may further be controlled to run remotely, and/or automatically, or may be operated manually, as desired.

EXAMPLE

According to an aspect of the present disclosure, the following protocol was conducted. The inner surface of an aircraft window with distortion was heated to a temperature of 155 to 160° F. for two (2) hours without any window removal or window re-working (in other words the window was heated in situ). The inner and outer surfaces of the window were cleaned using MS-260 glass cleaner (Miller-Stephenson Chem. Co., Inc., Danbury, Conn.). Scratches or defects other than the distortion were noted. The experimental set-up for the exterior of the window comprised the following steps. Both sides of an aluminum heat distributer were cleaned with MS-260 cleaner, and the heat distributer was placed directly on the outside surface of the window. The heat distributer was secured using Teflon tape (Nitto, Lakewood, N.J.), ensuring that even spacing was maintained between the window nib seal and the heat distributer. Four (4) thermocouples (FLUKE, Everett, Wash.) were placed in contact with and onto the aluminum heat distributer at predetermined locations. Thermocouple wire (AirTech Int'l. Chino, Calif.) ends were in direct contact with the heat distributer, and thermocouple wires were plugged into the heat distributer controller. A breather cloth was placed around the periphery of the heat distributer and secured to the aircraft and the heat distributer using Teflon tape. A composite heat blanket (HeatCon, Seattle, Wash.) was placed onto the heat distributer, while insuring that the heat blanket did not contact the aircraft skin. The heat blanket controller (BriskHeat, Columbus, Ohio) was set to a temperature of 167° F. The breather cloth was placed over the entire composite heat blanket as a heat insulator.

The following steps for the interior of the window set-up were conducted as follows. A heat insulation box frame was positioned in the aircraft cabin insuring that the frame did not contact the inside (i.e. interior) surface of the window. The heat insulation box comprised a supporting frame, with the heat insulation box maintained at a distance from the interior surface of the window of about 0.2". The heat box was attached to the heat box frame and secured using Teflon tape. A support pedestal was positioned to engage the floor of the cabin at a location beneath the heat box, and extended upward to contact the bottom of the heat box, for the purpose of supporting the heat box. Heat guns (Steinel, Germany) were positioned onto a heat gun pedestal made from a modified light stand (Fostoria), with the nozzle ends of the heat guns positioned to extend into the heat insulation box through holes in the heat insulation box. The holes in the heat box were dimensioned appropriately to accommodate entry of the nozzle ends of the heat guns into the heat box a desired and predetermined distance.

Power was then supplied to the composite heat blanket. A heat ramp rate for the composite heat blanket of about 7° F./minute was set and observed until the thermocouples attached to the composite heat blanket registered a temperature of 167° F. Power was then supplied to the heat guns to maintain an observed temperature on the thermocouple (FLUKE, Everett, Wash.) of 165° F. +/−2° F. Four (4) thermocouples (not shown) were placed in each corner of the heat box and positioned within about 1" of, but were not in contact with, the interior surface of the interior of the window. Heat levels on the heat guns and on the thermal blanket were maintained for 2.5 hours. Power to the heat blanket and the heat guns was turned off, and the window was allowed to cool to ambient temperature. The above-outlined equipment was removed from the exterior and interior of the window, and the previously observed distortion in the window was absent, as the distortion had been removed.

Aspects of the present disclosure are directed to reducing or substantially removing distortion from a transparent substrate in situ. Transparent substrates include, without limitation, windows and windshields. Contemplated transparent substrates include those made from a single material, as well as those comprising multiple materials, including those comprising layers or laminates. Of particular interest are transparent substrates, said transparent substrates comprising layers of glass and non-glass, and also transparent substrates comprising no glass. Aspects of the present disclosure include tailoring the distortion-eliminating (i.e. substantially eliminating), or distortion-reducing procedures disclosed herein to meet the demands and limitations of the transparent substrates themselves. That is, by altering the temperatures applied to the two sides of the transparent substrates, as well as the duration, the procedures disclosed herein work effectively to reduce or substantially eliminate distortion from transparent substrates by tailoring the procedures set forth herein to take into account transparent substrate composition, thickness, amount of distortion, presence of laminates or layers, etc.

Aspects of the present disclosure are directed to reducing or substantially eliminating the distortion of transparent substrates, including, without limitation, windows and windshields. For the purposes of the present disclosure, the terms "windshield" and "window" are used interchangeably, and therefore are deemed to have equivalent meaning. Such windows are typically multi-layered, optically transparent structures comprising non-glass layer(s) sandwiched between glass layers. Typical non-glass layers include, without limitation, thermoset and thermoplastic polymers such as polyurethane, polyvinyl butyral-containing resins, polyether-containing films, etc., and combinations thereof.

Non-glass layers often act as so-called "anti-spalling" layers; layers that serve to inhibit the release of shattered glass from the transparent structure (e.g. windows and windshields, etc.) While bound to no particular theory, it is believed that this polymeric material that acts as an anti-spalling layer contributes to the force induced distortion that occurs in transparent structures comprising such anti-spalling layers. It is believed that thermoset polymeric materials contained in the transparent windshield structures become stressed due to pressure and/or temperatures that approach or exceed the material's glass transition temperature, leading to distortion of the transparent structure. Such thermoset materials used in the manufacture of windows and windshields are often processed at temperatures approaching or exceeding about 220° F. However, when such materials are exposed to temperatures of about 140° F., noticeable distortion can occur. Such distortion has been referred to as force induced distortion.

Previously, such force induced distortion in transparent structures in aircraft or other vehicles ordinarily resulting in the need to replace such structures from the vehicles. According to aspects of the present disclosure, it is now possible to reduce or substantially eliminate optical distortion from transparent structures by applying sustained heat at predetermined levels for prescribed durations to both sides of the transparent structures (and to a level that is below the material's glass transition temperature and/or melting point, but above the temperatures at which the distortion was induced). Again, while being bound by no particular theory, it is believe that by observing the spirit of the protocols set forth herein, the materials in the transparent structure "relax" and re-orient their structure to a non-distorted and desirable orientation. Thermoset and, more commonly, thermoplastic components, when subjected to elevated temperatures, can re-orient their structure when in contact with a foreign object to accommodate the shape and form of the object. As set forth herein, and according to aspects of the present disclosure, the desirable re-orientation is achieved by elevating the temperature of both sides of the window above the temperature at which the force-induced distortion was induced.

Such force induced distortion in transparent substrates is visible to the naked eye, and is also known as "rippling". Optical distortion can be optically sensed through the use of optical sensors and interferometers. According to aspects of the present disclosure, the processes and protocols reduce distortion to any degree required to return the previously distorted transparent substrate to optimum performance, without removing the substrate from its installed state (e.g. from a building, an aircraft or other vehicle, etc.). That is, the processes described herein can reduce distortion from a 10% to 100% for a transparent substrate, while treating the substrate in situ.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, transparent components and parts designed to be positioned on the exterior or interior of stationary objects including, without limitation, general construction objects, buildings, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, manned and unmanned aircraft, spacecraft, rotorcraft, satellites, rockets, missiles, terrestrial vehicles, non-terrestrial vehicles, and even surface and sub-surface water-borne vehicles and objects.

When introducing elements of the present disclosure or exemplary aspects thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While the preferred variations and alternatives of the present disclosure have been illustrated and described, it will be appreciated that various changes and substitutions can be made therein without departing from the spirit and scope of the disclosure.

What is claimed is:

1. A system for reducing optical distortion from a transparent substrate, the system comprising:
a first heat source configured to contact a first side of a transparent substrate, said transparent substrate comprising an amount of optical distortion;
a first controller configured to control a desired temperature of the first heat source for a predetermined amount of time, said first controller in communication with the first heat source;
a second heat source configured to be positioned proximate to a second side of the transparent substrate,
a second controller configured to control a desired temperature of the second heat source for a predetermined amount of time, said second controller in communication with the second heat source; and
wherein the transparent substrate comprises at least two layers of dissimilar material.

2. The system of claim 1, further comprising:
a first heat sensor configured to sense a temperature of the first side of the transparent substrate, said first heat sensor in communication with at least one of the first controller and the second controller.

3. The system of claim 1, the transparent substrate comprising at least one of:
a windshield and a window.

4. The system of claim 1, wherein the first side of the transparent substrate comprises a first side exterior surface, and the first heat source comprises a heat blanket.

5. The system of claim 1, wherein the second side of the transparent substrate comprises a second side interior surface, and the second heat source comprising at least one of: at least one heat gun; at least one heat lamp; or at least one infrared heater.

6. The system of claim 1, wherein the second heat source is in communication with a device for radiating heat.

7. The system of claim 1, wherein the second heat source is positioned at a predetermined distance from the second side of the transparent substrate.

8. The system of claim 1, wherein the first side of the transparent substrate comprises a first side exterior surface and said first heat source is configured to direct an amount of heat to first side exterior surface, said first side exterior surface maintained at a first side exterior surface temperature ranging from about 160° F. to about 167° F. for a duration ranging from about 150 mins to about 210 mins.

9. The system of claim 6, wherein the second side of the transparent substrate comprises a second side interior surface and said second heat source is configured to direct an amount of heat to second side interior surface, said second side interior surface maintained at a second side interior surface temperature ranging from about 160° F. to about 165° F. for a duration ranging from about 150 mins to about 210 mins.

10. The system of claim 1, wherein said system reduces optical distortion present in the transparent substrate in situ.

11. The system of claim 1, wherein system reduces optical distortion present in the transparent substrate in an amount ranging from about 10% to about 100%.

12. The system of claim 1, wherein the first side of the transparent substrate comprises at least one layer comprising a polymeric thermoset-containing material.

13. The system of claim 1, wherein the transparent substrate comprises a layer comprising a polyurethane-containing material, a polyvinyl butyral resin-containing material, a polyether-containing material, or combinations thereof.

14. The system of claim 1, wherein the transparent substrate comprises a layer configured to act as a spall shield.

15. The system of claim 1, wherein the second side of the transparent substrate comprises at least one layer comprising glass.

16. The system of claim 2, further comprising:
a second heat sensor configured to sense a temperature of the second side of the transparent substrate, said second heat sensor in communication with at least one of the first controller and the second controller.

17. The system of claim 9, wherein the device for radiating heat is a heat box, said heat box configured to contain at least a portion of the second heat source.

18. The system of claim 17, wherein the device for radiating heat is configured to provide the second side interior surface temperature to the second side interior surface, said second side interior surface temperature having a temperature that does not exceed the a glass transition temperature and does not exceed a melting point of a material positioned adjacent to the second side interior surface of the transparent substrate.

19. The system of claim 18, said material positioned adjacent to the second side interior surface of the transparent substrate is selected from the group comprising at least one of: a molding, a fastener, or a fitting.

20. The system of claim 1, wherein the transparent substrate comprises no glass.

* * * * *